(12) United States Patent
Ueda

(10) Patent No.: US 9,703,805 B2
(45) Date of Patent: Jul. 11, 2017

(54) INDIVIDUAL VERIFICATION APPARATUS, INDIVIDUAL VERIFICATION METHOD AND COMPUTER-READABLE RECORDING MEDIUM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Motoshi Ueda, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 111 days.

(21) Appl. No.: 14/724,923

(22) Filed: May 29, 2015

(65) Prior Publication Data

US 2016/0350582 A1 Dec. 1, 2016

(51) Int. Cl.
*G06K 9/00* (2006.01)
*G06F 17/30* (2006.01)
*G06K 9/03* (2006.01)

(52) U.S. Cl.
CPC ......... *G06F 17/30247* (2013.01); *G06K 9/00* (2013.01); *G06K 9/00255* (2013.01); *G06K 9/036* (2013.01)

(58) Field of Classification Search
CPC ..... A61B 5/0059; A61B 5/0064; A61B 5/024; A61B 5/1176; A61B 5/150786; A61B 5/153; A61B 5/72; A61B 5/02; A61B 3/113; A61B 2090/3762; A61B 5/117; A61M 5/427; G06K 9/00026; G06K 9/00275; G06K 9/6212; G06K 9/00234; G06K 9/00208; G06K 9/00228; G06K 9/00268; G06K 9/00288; G06K 9/4661; G06K 9/001; G06K 9/00006; G06K 9/00067; G06K 9/6211; G06K 9/00597; G06K 9/00362; G06K 9/00771;
(Continued)

(56) References Cited

U.S. PATENT DOCUMENTS 5,067,162 A * 11/1991 Driscoll, Jr. ....... G06K 9/00067
382/126
5,835,616 A * 11/1998 Lobo .................. G06K 9/00221
382/115
(Continued)

FOREIGN PATENT DOCUMENTS

JP 2005-165943 6/2005

*Primary Examiner* — Vu Le
*Assistant Examiner* — Aklilu Woldemariam
(74) *Attorney, Agent, or Firm* — Amin, Turocy & Watson, LLP

(57) ABSTRACT

Certain embodiments provide an individual verification apparatus, comprising: a database configured to associate a face image having the brightness and the light reception direction of an image region with the personal information of an individual; a correction section configured to carry out a correction operation using a correction amount pre-stored for image data for verification having another brightness and another light reception direction; and a verification section configured to verify the individual using the face part in the image data for verification which is corrected in at least one of brightness and light reception direction and the face image in the database.

10 Claims, 13 Drawing Sheets

(58) Field of Classification Search
CPC .......... G06K 9/00369; G06K 9/00013; G06K 9/00221; G06K 9/00087; G06K 9/00302; G06K 9/52; G06K 9/00885; G06K 9/00496; G06F 3/013; G06F 3/005; G06F 21/32; G06F 17/00; G06F 21/34; G06T 7/0012; G07D 7/20; G01J 2005/0077; G09G 3/3283; G06Q 20/40145
USPC ....... 382/107, 165, 190, 209, 118, 142, 278, 382/280, 282, 284
See application file for complete search history.

(56) References Cited

U.S. PATENT DOCUMENTS

| | | | | |
|---|---|---|---|---|
| 6,292,575 B1 * | 9/2001 | Bortolussi | .......... | G06K 9/00234 382/107 |
| 7,130,454 B1 * | 10/2006 | Berube | .............. | G06K 9/00234 382/118 |
| 7,227,977 B1 * | 6/2007 | Dotsenko | ........... | G06K 9/00234 345/426 |
| 2003/0059124 A1 * | 3/2003 | Center, Jr. | ......... | G06K 9/00234 382/278 |
| 2004/0228508 A1 * | 11/2004 | Shigeta | .............. | G06K 9/00026 382/124 |
| 2005/0271258 A1 * | 12/2005 | Rowe | ................. | G06K 9/00046 382/124 |
| 2006/0078172 A1 * | 4/2006 | Zhang | ................ | G06K 9/00268 382/118 |
| 2006/0120571 A1 * | 6/2006 | Tu | ....................... | G06K 9/00281 382/118 |
| 2006/0126905 A1 * | 6/2006 | Loo | .................... | G06K 9/00255 382/118 |
| 2006/0146062 A1 * | 7/2006 | Kee | .................... | G06K 9/00275 345/582 |
| 2006/0153429 A1 * | 7/2006 | Gehlen | .............. | G06K 9/00228 382/118 |
| 2007/0019083 A1 * | 1/2007 | Nakashima | ............ | H04N 5/232 348/239 |
| 2007/0274592 A1 * | 11/2007 | Matsuhira | ............ | H04N 1/6027 382/190 |
| 2011/0182482 A1 * | 7/2011 | Winters | ............ | G06F 17/30256 382/116 |
| 2013/0070973 A1 * | 3/2013 | Saito | ...................... | G06K 9/036 382/118 |
| 2013/0182915 A1 * | 7/2013 | Hanna | .................... | A61B 5/117 382/116 |
| 2013/0243278 A1 * | 9/2013 | Saito | ................. | G06K 9/00281 382/128 |
| 2014/0121637 A1 * | 5/2014 | Boyden | ................. | A61M 5/427 604/506 |
| 2015/0055821 A1 * | 2/2015 | Fotland | ................ | G06K 9/3241 382/103 |

* cited by examiner

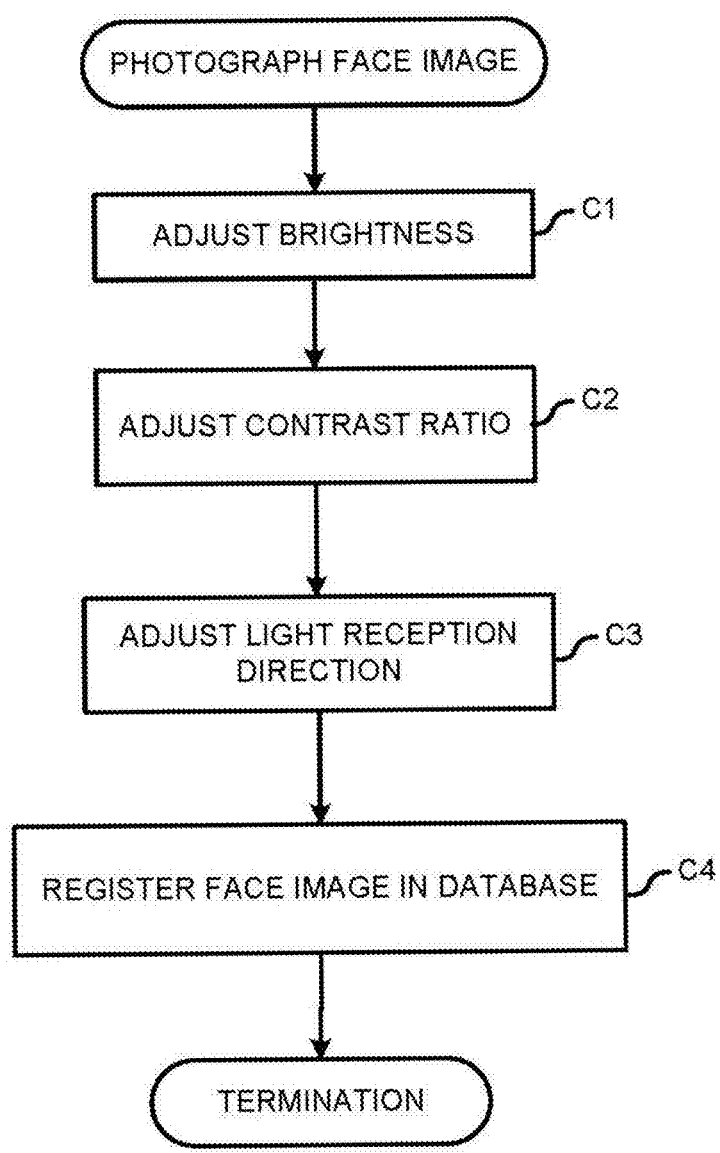

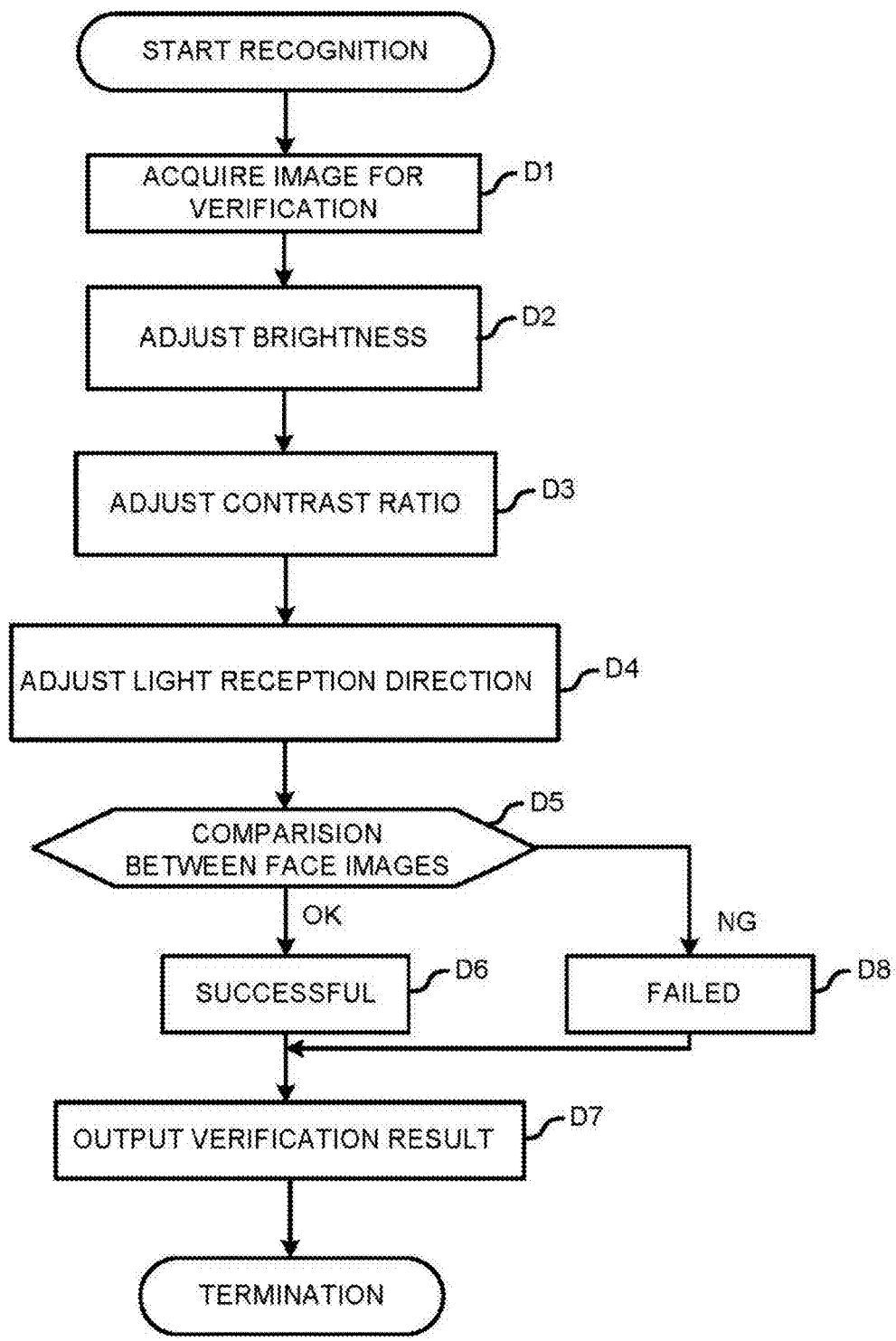

INDIVIDUAL VERIFICATION APPARATUS, INDIVIDUAL VERIFICATION METHOD AND COMPUTER-READABLE RECORDING MEDIUM

FIELD

Certain embodiments relate to an individual verification apparatus, an individual verification method and a non-transitory computer-readable recording medium.

BACKGROUND

A copier is known which is provided with an individual verification system based on a camera.

The camera takes the image of a face. A plurality of face images are registered in a database. The system verifies an individual using the image data of the individual and the image data in the database.

The copier is placed at a certain position which is fixed with respect to a window. The angle of view of the camera is fixed.

However, the intensity of light varies. For the camera, sunlight comes from different directions with different intensities. The brightness around the copier is different at 8.00 am, 12.00 pm and 5.00 pm.

At night, an indoor illuminator, instead of the sunlight coming from the window, irradiates the camera. The light of an identification lamp irradiates the copier from the window at night.

For the camera, the light of a light source comes from different directions and different angles indifferent seasons. The brightness of the light source changes with the weather.

The brightness, the contrast ratio and the light reception direction of an installed camera change with the surroundings.

An individual verification apparatus, even when used to take the face image of the same person, is different in face recognition precision in different environments.

BRIEF DESCRIPTION OF THE DRAWINGS

FIG. 9 is a flowchart illustrating a process of registering data in the face image database of the individual verification apparatus according to the first embodiment;

FIG. 10 is a flowchart illustrating a recognition processing carried out by the individual verification apparatus according to the first embodiment.

DETAILED DESCRIPTION

Certain embodiments provide an individual verification apparatus, including: a database configured to associate a face image with the personal information of an individual, wherein the face image has the first brightness and the first light reception direction of an image region in which an individual is irradiated by a light source the direction of which varies if observed from a fixed line-of-sight direction; a correction section configured to carry out a correction operation using a correction amount pre-stored for image data for verification, wherein the image data for verification has a second brightness and a second light reception direction; and a verification section configured to verify the individual using the face part in the image data for verification and the face image stored in the database, wherein at least one of the second brightness and the second light reception direction of the face part of the image data for verification is corrected.

By taking those shown in accompanying drawings as an example, the individual verification apparatus, the individual verification method and the computer-readable recording medium are described below in detail. Moreover, in the accompanying drawings, the same parts are denoted by the same reference signs and are not described repeatedly when presented again.

A First Embodiment

Figure 1:
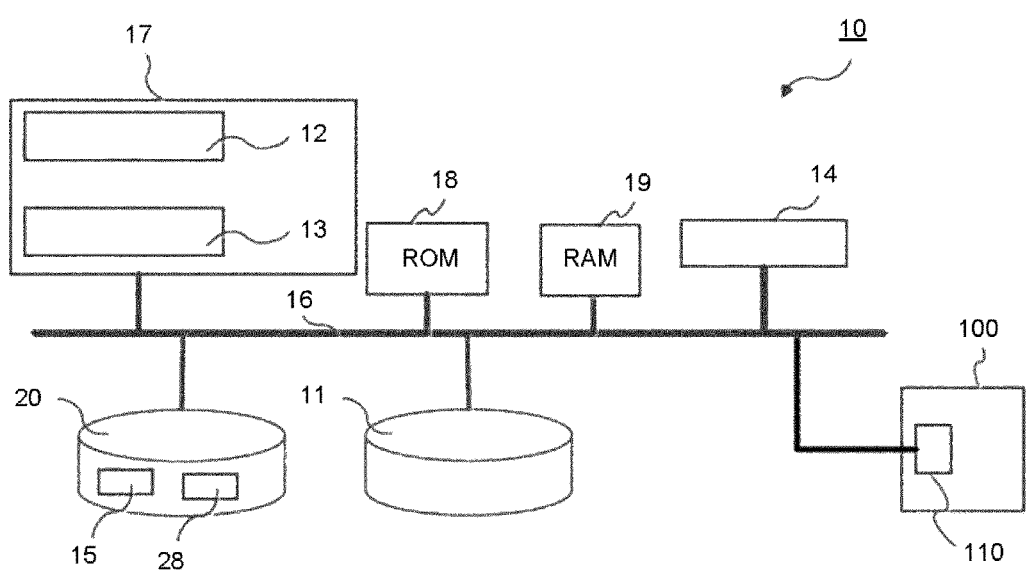
FIG. 1 is a block diagram illustrating an individual verification apparatus according to a first embodiment.

FIG. 1 is a block diagram illustrating an individual verification apparatus involved in the first embodiment. An individual verification apparatus 10 verifies, using a face image, the identity of the operator of a copier installed indoors.

The individual verification apparatus 10 comprises a database 11, a correction section 12, a verification section 13, a camera 14 and a storage section 15.

The database 11 associates a face image with personal ID (identification) (personal information) and stores the associated face image and personal ID, wherein the face image having the brightness, the contrast ratio and the light reception direction of an image region in which an individual is irradiated by a light source the direction of which varies if observed from a fixed line-of-sight direction.

The correction section 12 carries out a correction operation using a correction amount pre-stored for image data for verification which has another brightness, another contrast ratio and another light reception direction.

The verification section 13 verifies an individual using the face part of the image data for verification and the face image in the database 11, wherein at least one of the brightness, the contrast ratio and the light reception direction of the face part of the image data for verification is corrected by the correction section 12.

The camera 14 separately acquires image data for registration and image data for verification at different timing.

The image data for registration refers to a user image which is registered in the database 11 before a user is verified. The image data for verification refers to a user image which is compared with the image data for registration that serves as a reference.

The storage section 15 stores first reference values for the brightness, the contrast ratio and the light reception direction of a background image.

The database 11 associates the face images of a plurality of persons with their personal ID information separately such as their employee numbers.

The face image is an image taken by the camera 14 from a fixed line-of-sight direction. The fixed line-of-sight direction is the line-of-sight direction of the camera 14 fixed on the copier 100.

The face image has attribute values including brightness, contrast ratio and light reception direction.

The light source is sunlight, an indoor illuminator or an outdoor identification lamp.

Figure 2:
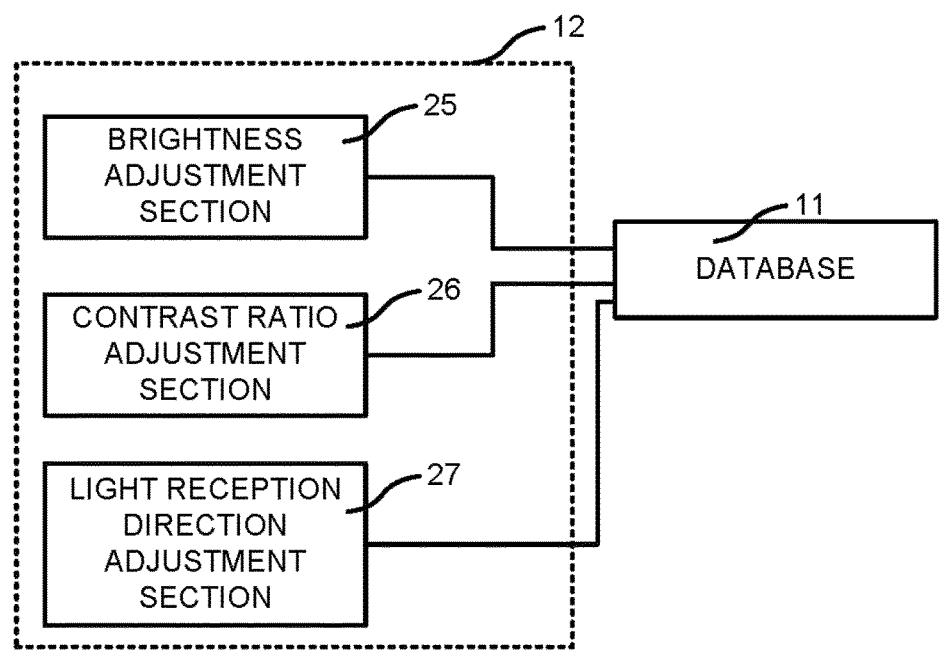
FIG. 2 is a functional block diagram illustrating the correction section of the individual verification apparatus according to the first embodiment.

FIG. 2 is a functional block diagram illustrating the correction section 12. The reference signs which are illustrated above denote the same components in FIG. 2.

The correction section 12 comprises a brightness adjustment portion 25 and a contrast ratio adjustment portion 26.

The brightness adjustment portion 25 carries out a brightness adjustment.

Brightness refers to brightness values of R (red), G (green) and B (blue). The brightness of a pixel represents an RGB with a brightness value of, for example, eight bits. Each RGB of the plurality of pixels in an image region has a brightness value.

The brightness adjustment portion 25 adjusts all brightness values of RGB.

The contrast ratio adjustment portion 26 carries out a contrast ratio adjustment. Contrast ratio refers to the black-to-white ratio in an image region. Black refers to the minimal brightness, and white refers to the maximum brightness.

The correction section 12 is provided with a light reception direction adjustment portion 27 for adjusting a light reception direction.

Figure 3A:
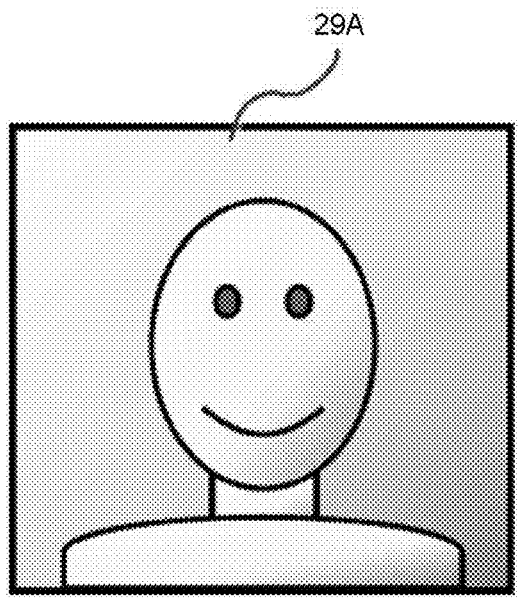
FIG. 3A is a diagram showing an example of an image facing the individual verification apparatus according to the first embodiment.
Figure 3B:
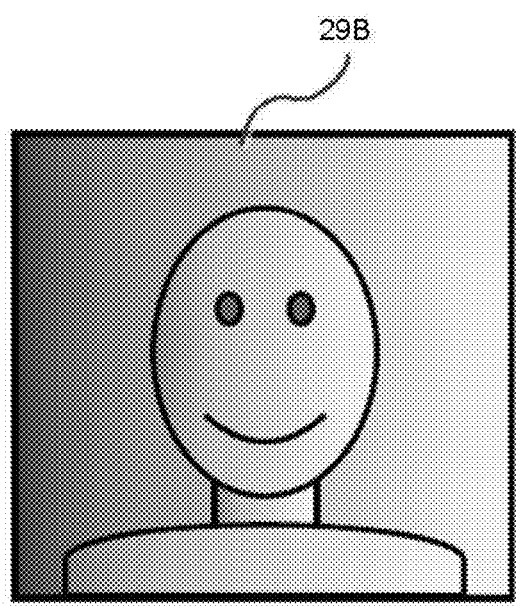
FIG. 3B is a diagram showing another example of an image facing the individual verification apparatus according to the first embodiment.

FIG. 3A and FIG. 3B show examples of images taken in the morning and at dusk.

In the image 29A taken by the camera 14, the left-upper area is higher in brightness, and the right-lower area of the image 29A is lower in brightness, wherein 'higher' and 'lower' are relative.

In the image 29B taken by the camera 14, the area between the right top and the right bottom is higher in brightness, and the area between the left top and the left bottom is lower in brightness.

The light reception direction refers to the direction along which brightness lowers from the brightness of a high-brightness area to that of a low-brightness area in the image data.

In the image region 29A, brightness changes in the direction from the left-upper vertex to the right-lower vertex.

In the image region 29B, brightness changes in the horizontal direction.

The light reception direction adjustment portion 27 changes the light reception direction of the image region 29A or 29B by inclining the perpendicular line of the horizontal centerline of the image region 29A or 29B by an angle (degree).

The correction section 12 shown in FIG. 1 corrects the image data for registration based on the first reference values of the background image. After completing the correction operation based on the first reference values, the correction section 12 registers the face image the brightness, the contrast ratio and the light reception direction of which are updated to second reference values in the database 11.

The correction section 12 corrects the image data for verification using the second reference values.

The verification section 13 compares the face image which is stored in the database 11 after being updated in brightness, contrast ratio and light reception direction with the face image in the image data for verification acquired by the camera 14. The verification section 13 outputs a result representing the success or failure of the face verification according to the result of the comparison.

Figure 4:
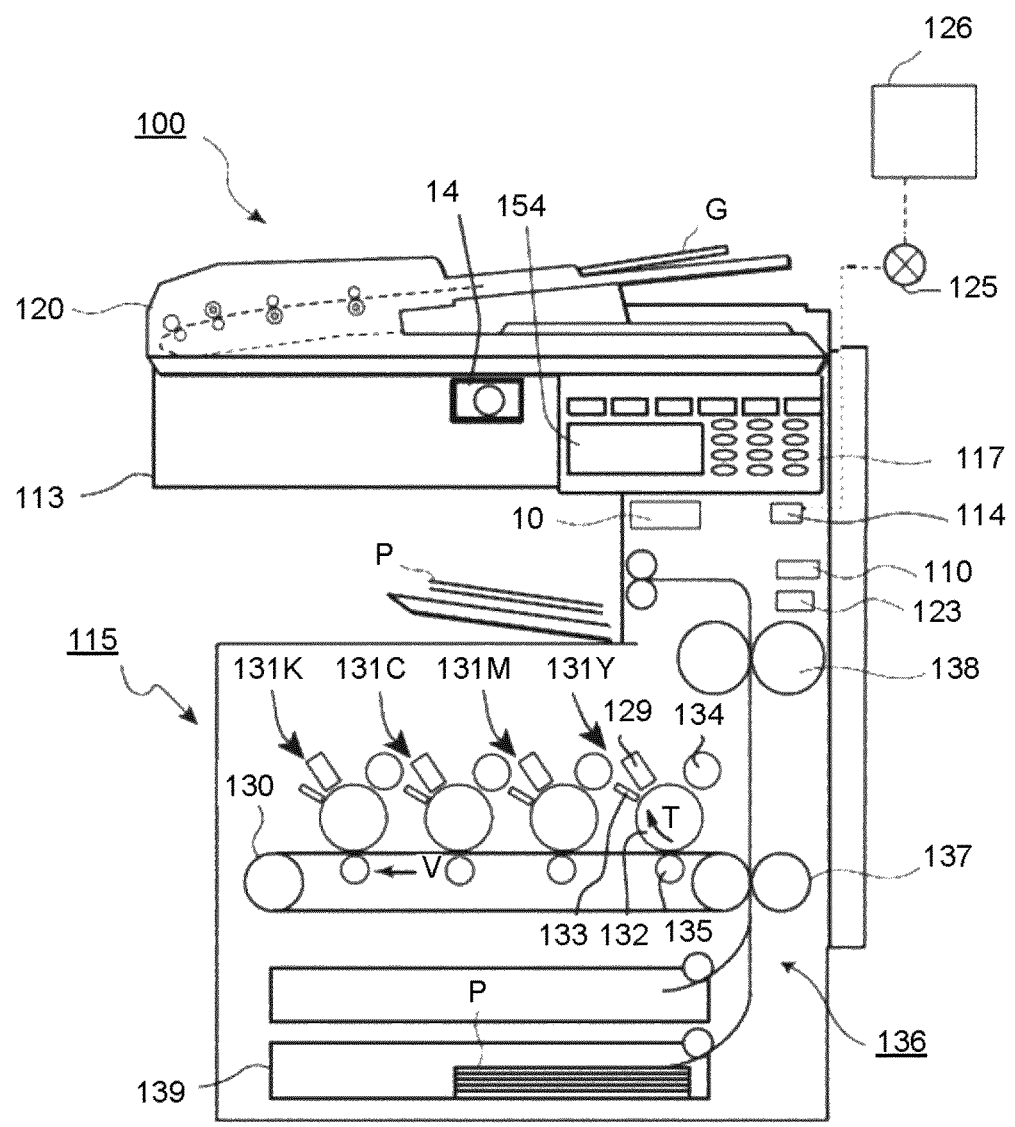
FIG. 4 is a diagram illustrating the structure of a copier provided with the individual verification apparatus according to the first embodiment.

FIG. 4 is a diagram illustrating the structure of a copier provided with the individual verification apparatus 10. The reference signs which are described above denote the same elements in FIG. 4.

The camera 14 is fixed on the copier 100 at a position where the camera 14 constitutes no obstacle to the user operating the copier 100.

The camera 14 which uses a Charge Coupled Device (CCD) image sensor or a Complementary MOS (COMOS) image sensor is positioned with its image sensor panel facing the face of the user.

The image data for registration has its brightness, contrast ratio and light reception direction. The image data for verification also has its brightness, contrast ratio and light reception direction.

The first reference values stored in the storage section 15 shown in FIG. 1 are values for correcting the face image registered in the database 11. The first reference brightness, the first reference contrast ratio and the first reference light reception direction each have a value of a plurality of bits.

The storage section 15 uses a storage device 20 which is a hard disk drive or a solid state drive.

The individual verification apparatus 10 may further comprise a reference value generation section 28 configured to generate first reference values for the brightness, the contrast ratio and the light reception direction of a background image.

Further, there is a central Processing Unit (CPU) 17, a Read Only Memory (ROM) 18, a Random Access Memory (RAM) 19 and the camera 14 on the bus line 16 of the individual verification apparatus 10.

The CPU 17, the ROM 18 and the RAM 19 execute the functions of the correction section 12 and the verification section 13.

The CPU 17 functions as the main controller of the individual verification apparatus 10.

The RAM 19 provides a working storage area for the CPU 17.

The ROM 18 is a non-transitory computer-readable recording medium for causing the CPU 17 to execute the following processing:

a processing of correcting the brightness, the contrast ratio and the light reception direction of the face image and the background image in an image region;

a processing of generating first reference values for the brightness, the contrast ratio and the light reception direction of the background image;

a processing of correcting image data for registration which as its brightness, contrast and light reception direction based on the first reference values of the background image, associating the face image with personal ID and performing a write access processing on the address of the database 11, wherein the face image has second reference values in brightness, contrast ratio and light reception direction;

a processing of correcting image data for verification having another brightness, another contrast ratio or another light reception direction using the second reference values to generate corrected image data for verification; and a processing of verifying an individual using the face part in the image data for verification and the face image in the database 11.

The bus line 16 is electrically connected with the controller 110 of the copier 100.

As shown in FIG. 4, the copier 100 comprises a scanner 113, a network interface 114, a printer section 115 and a controller 110.

The scanner 113 scans one side of an original document G using a document feeder 120.

The network interface 114 receives printing spool data from a PC 126 through a network 125.

The printer section 115 configured to be installed and for a person to perform a user operation prints an image using four printing colors C, M, Y and K and then outputs the printed image.

The printer section 115 is equipped with four exposers 129, four image forming portions 131C, 131M, 131Y and 131K and a belt 130.

The exposer 129 modulates an image signal into laser rays using semiconductor laser of each color. The belt 130 endlessly travels anticlockwise.

The image forming portion 131 for yellow color comprises: a drum 132, a charger 133, a developer 134 and a transferring device 135.

The drum 132 is a photoconductive drum rotating along a clockwise direction T.

The charger 133 charges the surface of the drum 132.

The developer 134 develops the electrostatic latent image on the drum 132 using a toner.

The transferring device 135 primarily transfers the toner image on the drum 132 onto the belt 130.

The image forming portion 131M for magenta color, the image forming portion 131C for cyan color and the image forming portion 131K for black color are substantially structurally identical to the image forming section 131Y.

Further, the printer section 115 has a sheet conveying mechanism 136, a secondary transferring device 137 and a fixer 138.

The sheet conveying mechanism 136 takes a sheet P from a tray 139 and guides the sheet P to the printer section 115.

The secondary transferring device 137 secondarily transfers toner images of four colors formed by the image forming portions 131C, 131M, 131Y and 131K onto the sheet P.

The fixer 138 fixes unfixed toner images on the sheet P.

An operation panel 117 accepts a user operation.

The operation panel 117 may display the verification result of the individual verification apparatus 10 on a window 154 on which an operation step may also be displayed.

The controller 110 is the main controller of the copier 100. A control signal is transmitted between the controller 110 and the CPU 17 (shown in FIG. 1) of the individual verification apparatus 10.

Further, the individual verification method involved in the embodiment is an image processing method in the three timings carried out by the individual verification apparatus 10.

The first timing is the generation timing of first reference values.

The second timing is the generation timing of image data for registration in database 11.

The third timing is a verification timing at which an image for verification is used.

The individual verification method generates, during the first timing, first reference values for the brightness, the contrast ratio and the light reception direction of the background image in the image region photographed by the camera 14.

The individual verification method, during the second timing, carries out a correction operation for input of image data for registration using the correction section 12 based on the first reference values of the background image, wherein the background image is relative to the image data for registration, in this way, a face image having second reference values is associated with the ID of an individual and then registered in a database in association with the ID.

The individual verification method corrects, during the third timing, input image data for verification based on second reference values of image data for verification to generate corrected image data for verification.

The individual verification method verifies the individual using the face part of the image data for verification and the face image in the database 11.

Next, the functional actions of the individual verification apparatus 10 are described below.

The copier 100 detects a touch on the operation panel 117. The copier 100 displays a dialog box on the operation panel 117. The dialog box displays, for the user, an operational requirement to verify whether the user can use the copier 100 nor not.

For example, the operation panel 117 requires the user to input a login name and a password. Further, the operation panel 117 starts the face verification of the individual verification apparatus 10.

As the face verification succeeds, the copier 100 takes a job.

The registration of a user in the individual verification apparatus 10 before the face of the user is verified is described below.

Figure 5:
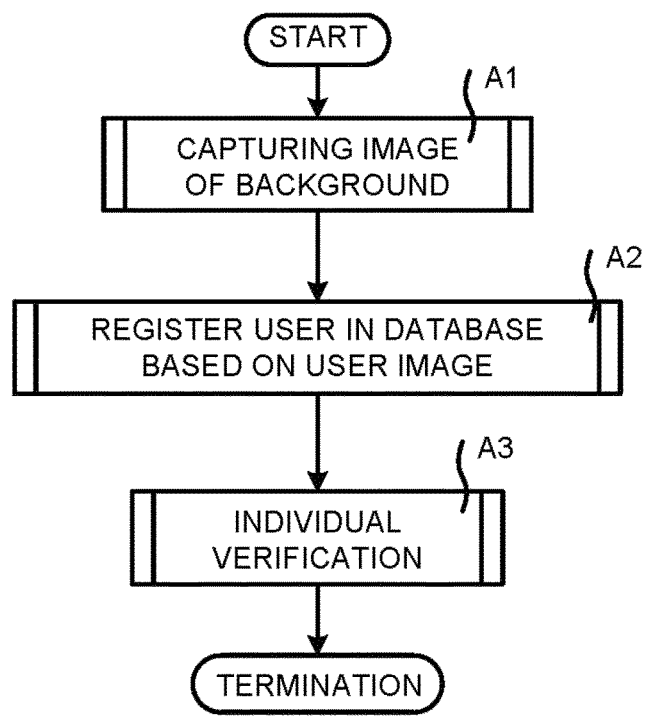
FIG. 5 is main flowchart illustrating a verification processing carried out by the individual verification apparatus according to the first embodiment.

FIG. 5 is main flowchart illustrating a verification processing carried out by the individual verification apparatus 10.

Actions A1, A2 and A3 are equivalent to the first timing, the second timing and the third timing.

The first timing is, for example, 8:00 am. The second timing is, for example, 12:00 pm. The third timing is, for example, 5:00 pm.

In Action A1, the individual verification apparatus 10 takes the image of a background image and generates three first reference values.

Figure 6:
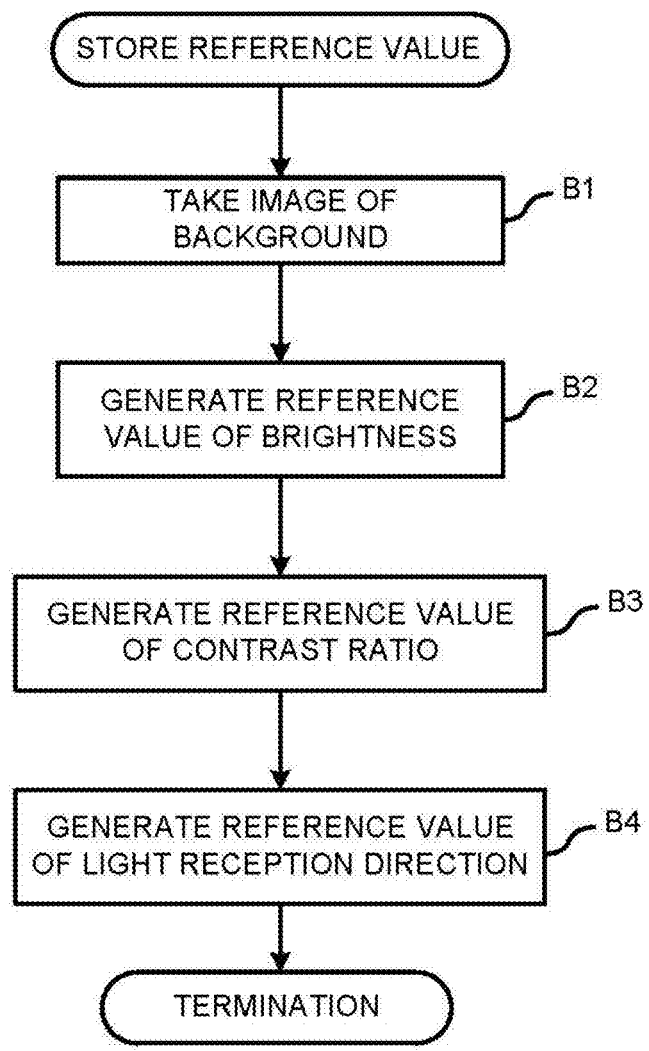
FIG. 6 is a flowchart illustrating a background image processing carried out by the individual verification apparatus according to the first embodiment.

FIG. 6 is a flowchart illustrating a background image processing carried out by the individual verification apparatus 10.

In Action B1, as an imaging signal is generated which indicates the taking of an image at 8:00 am, the camera 14 takes the image of the background image.

In Action B2, the individual verification apparatus 10 starts to generate a first reference value for the brightness in the background image.

Figure 7:
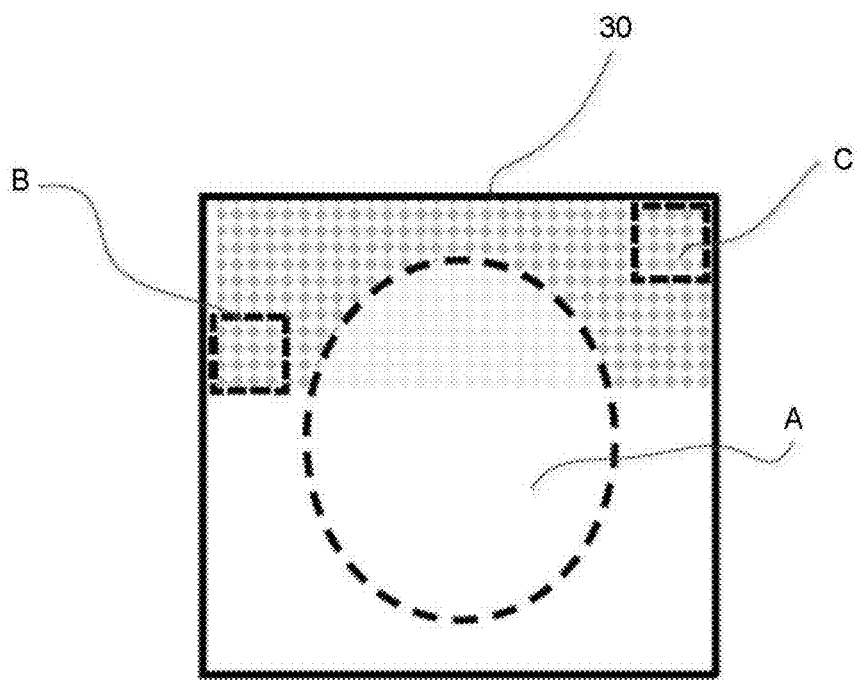
FIG. 7 is a diagram showing an example of the image region of the individual verification apparatus according to the first embodiment.

FIG. 7 is a diagram showing an example of an image region. The camera 14 outputs an image region 30. The image region 30 has three areas A, B and C.

The area A is an area for face verification.

The areas B and C are both areas recognized for determining first reference values for correction.

The reference value generation section 28 selects the area B or C as a reference value generation area.

The reference value generation section 28 selects an area in which the verified object, that is, the verified individual, is not reflected.

The reference value generation section 28 selects an area, for example, a wall or ceiling, which is always photographed by the camera 14 as a reference value generation area. The areas B and C are used for a comparison processing.

For example, the reference value generation section 28 calculates the brightness of the image region 30 by averaging the values of the colors between the color closest to the whitest color and the color closest to the darkest color.

Sequentially, the reference value generation section 28 calculates a first reference value for contrast ratio in Act B3 shown in FIG. 6.

For example, the reference value generation section 28 calculates the contrast ratio of the image region 30 by dividing the value closest to the lowest brightness by the value closest to the highest brightness.

Further, the reference value generation section 28 calculates a first reference value for light reception direction in Act B4.

Figure 8:
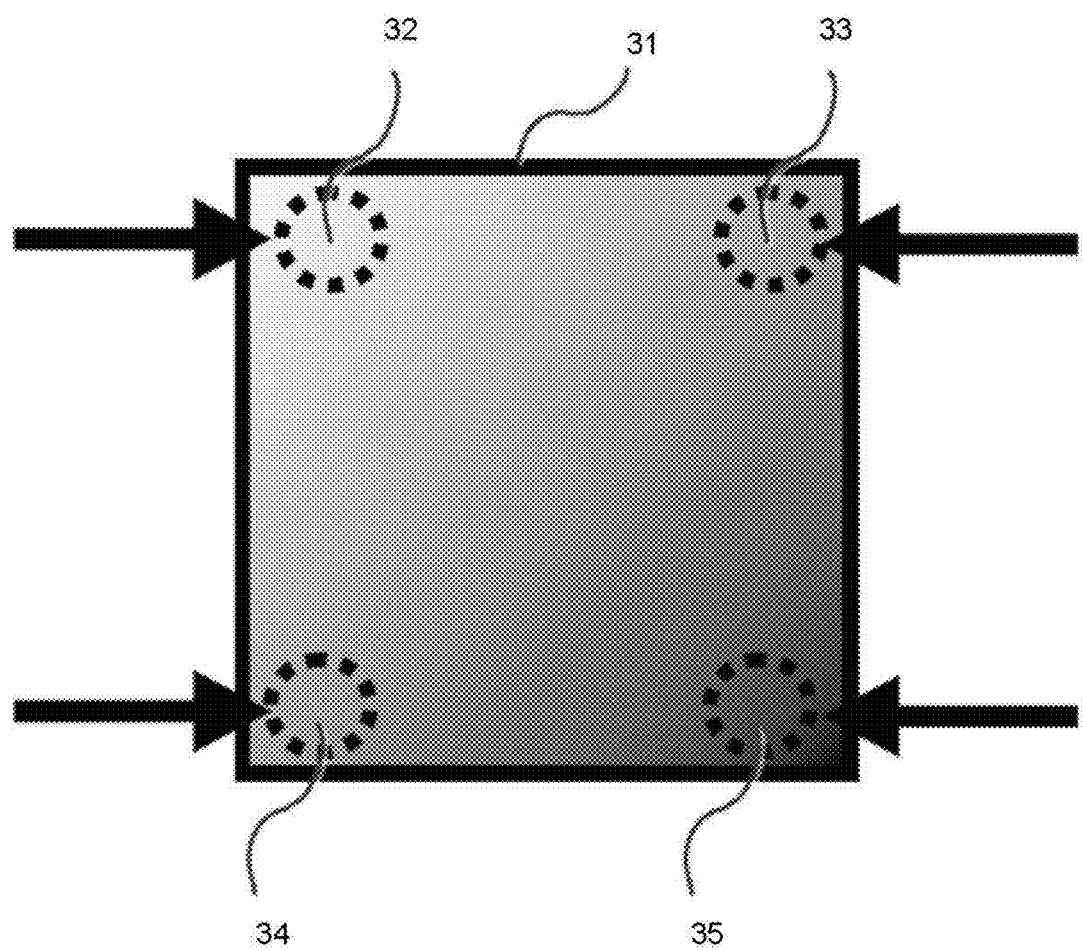
FIG. 8 is a diagram illustrating a detection method of light reception direction based on the individual verification apparatus according to the first embodiment.

FIG. 8 is diagram illustrating a light reception direction detection method. The image region 31 has a density because of a light source.

The reference value generation section 28 calculates a light reception direction by comparing the brightness values of the areas 32-35 at four corners of the photographed image region 31.

The reference value generation section 28 compares the brightness values of the areas 32 and 33. In the example shown in FIG. 8, the area 32 is higher in brightness than the area 33. Thus, it can be determined that in the horizontal direction of the reference value generation section 28, the left part of the image region is brighter than the right part of the image region.

Next, the reference value generation section 28 compares the brightness values of the areas 32 and 34. As the area 32 is higher in brightness than the area 34. Thus, it can be determined that in the vertical direction of the reference value generation section 28, the upper part of the image region is brighter than the lower part of the image region.

Further, the reference value generation section 28 compares a first difference between the brightness values of the areas 32 and 33 with a second difference between the brightness values of the areas 32 and 34.

The reference value generation section 28 determines whether or not one of the first and the second difference is greater or smaller than the other one.

As an example, the reference value generation section 28 pre-stores data or a formula representing the correspondence relationship between the difference component of the first and the second difference and an offset in the ROM 18.

An offset presenting the degree by which the light reception direction is deviated from the vertical light reception direction of the camera 14 can be determined based on the result of the foregoing determination. The offset presents an in-plane quantity.

An individual can be recognized more accurately by carrying out the foregoing three processing cooperatively.

In action A2 shown in FIG. 5, before registering a user in the database 11, the individual verification apparatus 10 takes an image of the user.

In action A2, the individual verification apparatus 10 compares the taken picture (image) with the first reference values.

FIG. 9 is flowchart illustrating a process of registering a user image containing a face image in the database of the individual verification apparatus 10.

In action C1, the individual verification apparatus 10 matches the brightness of the image with the first reference value for brightness.

The individual verification apparatus 10 matches the contrast and the light reception direction of the image with the first reference values for contrast ratio and light reception direction (actions C2 and C3).

Then, adjusted or corrected brightness, contrast ratio and light reception direction are obtained.

In action C4, the individual verification apparatus 10 registers the user image having second reference values in the database 11, wherein the second reference values refer to the adjusted or corrected brightness, contrast ratio and light reception direction.

In action A3 shown in FIG. 5, the individual verification apparatus 10 carries out an individual verification. The image data for verification obtained by the camera 14 is compared with the second reference values.

FIG. 10 is a flowchart illustrating a recognition processing carried out by the individual verification apparatus 10.

In action D1, the individual verification apparatus 10 acquires image data for verification from the camera 14.

Figure 11A:
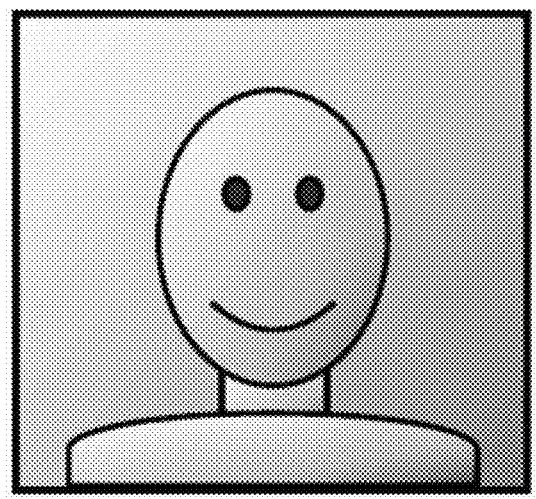
FIG. 11A is a diagram showing an example of an image registered in the database of the individual verification apparatus according to the first embodiment.

FIG. 11A is a diagram showing an example of an image registered in the database 11. The image is a registered image on which the processing of action C4 is performed.

Figure 11B:
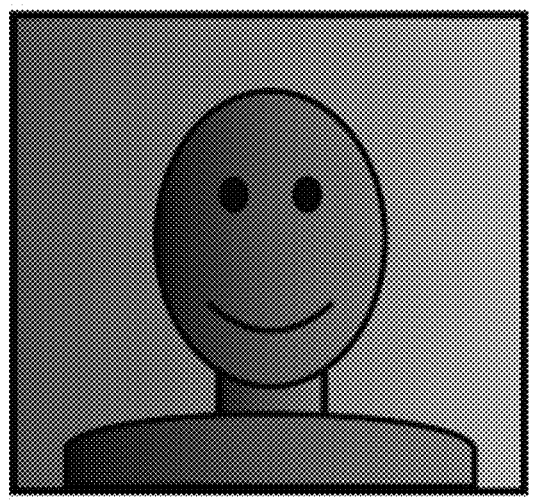
FIG. 11B is a diagram showing an example of an image for verification taken by the camera of the individual verification apparatus according to the first embodiment.

FIG. 11B is a diagram showing an example of an image for verification taken by the camera 14. The image is a user picture taken at 5:00 pm which is relatively dark as sunlight irradiates the camera obliquely.

Sequentially, in action D2 shown in FIG. 10, the individual verification apparatus 10 carries out a brightness adjustment based on second reference values.

Figure 12A:
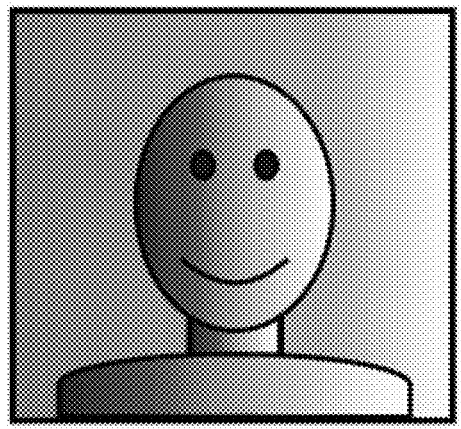
FIG. 12A is a diagram showing an image for verification the brightness of which is adjusted by the individual verification apparatus according to the first embodiment.

FIG. 12A is a diagram showing a brightness-adjusted image for verification. The image shown in FIG. 12A is obtained by adjusting the brightness of the image shown in FIG. 11B.

In action D3, the individual verification apparatus 10 carries out a contrast ratio adjustment.

Figure 12B:
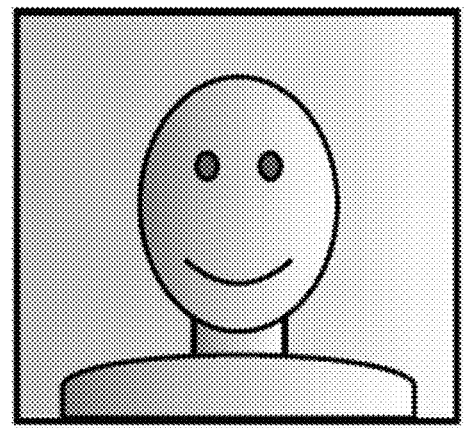
FIG. 12B is a diagram showing an image for verification the contrast ratio of which is adjusted by the individual verification apparatus according to the first embodiment.

FIG. 12B is a diagram showing a contrast ratio-adjusted image for verification. After being adjusted in contrast ratio, the image for verification shown in FIG. 12A is adjusted in brightness and contrast ratio.

In action D4, the individual verification apparatus 10 carries out a light reception direction adjustment.

Figure 12C:
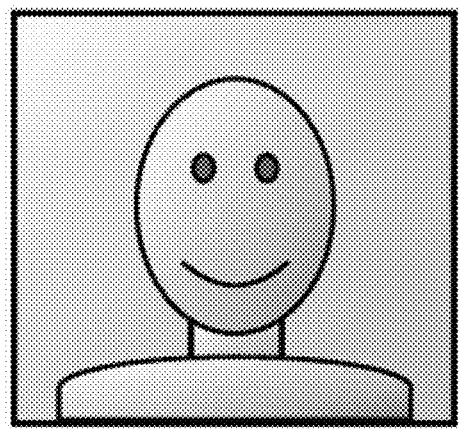
FIG. 12C is a diagram showing an image for verification the light reception direction of which is adjusted by the individual verification apparatus according to the first embodiment.

FIG. 12C is a diagram showing an image for verification adjusted in light reception direction. After being adjusted in light reception direction, the image for verification shown in FIG. 12A is adjusted in brightness, contrast ratio and light reception direction.

In this way, the brightness, the contrast ratio and the light reception direction of the image for verification are all matched with the second reference values.

In action D5, the individual verification apparatus 10 comparatively verifies a face image.

In action D5, the result of the comparison is 'matched'. In action D6, the individual verification apparatus 10 determines that the verification is successful through an 'OK' route.

In action D7, the individual verification apparatus 10 outputs a positive verification result.

In action D5, the result of the comparison is 'unmatched'. In action D8, the individual verification apparatus 10 determines that the verification is failed through a 'NG' route. The individual verification apparatus 10 outputs a negative verification result (action D7)

A specific user is permitted to use the copier 100. An original document G is set through a user operation (FIG. 4), and then the copier 100 copies the original document G.

As the brightness, the contrast ratio and the light reception direction of an image for verification are adjusted prior to the implementation of an individual verification. The adjusted face image is registered in the database 11. Apart from the influence caused by face data, the influence caused by the background surrounding the individual making a registration is also eliminated.

Even in a case where the bust picture taken by the camera 14 contains a background, for example, a ceiling or wall, in the areas B and C outside the area A (FIG. 7), the face verification can be completed highly accurately.

The copier 100 is installed and used. The camera 14 generally photographs the same background.

By correcting an image using the pattern and the color of a background, the individual verification apparatus 10 improves the recognition accuracy.

The same individual is identified as the same individual, regardless of the brightness of the surroundings.

The accuracy of individual recognition is improved no matter what the contrast ratio in a bright or dark environment is.

An individual can be correctly recognized in the morning or at dusk when sunlight comes from a different direction.

Further, the individual verification apparatus 10 may also take the image of a background during the period of time within which the copier 100 is used frequently.

The first reference values are generated based on a plurality of persons and the same time period, thereby obtaining the brightness, the contrast ratio and the light reception direction which are substantially the means of those obtained from the images of the plurality of persons.

The illumination around the copier 100 changes according to the surroundings, for example, the illumination around the copier 100 changes with sunlight during the day and an illuminator or identification lamp at night. With the use of the individual verification apparatus 10, the recognition accuracy is guaranteed in any environment. The same person can be recognized correctly in any period of time.

Provided with an individual verification system for carrying out an individual verification using a face image, the copier 100 achieves a high verification accuracy.

A Second Embodiment

In the first embodiment, when the user registers at 12:00 pm, an image correction is carried out using the first reference values generated at 8:00 am.

The first reference values are not used in the second embodiment. After collecting information from an information server through a network, the individual verification apparatus involved in the embodiment carries out an image correction.

Figure 13:
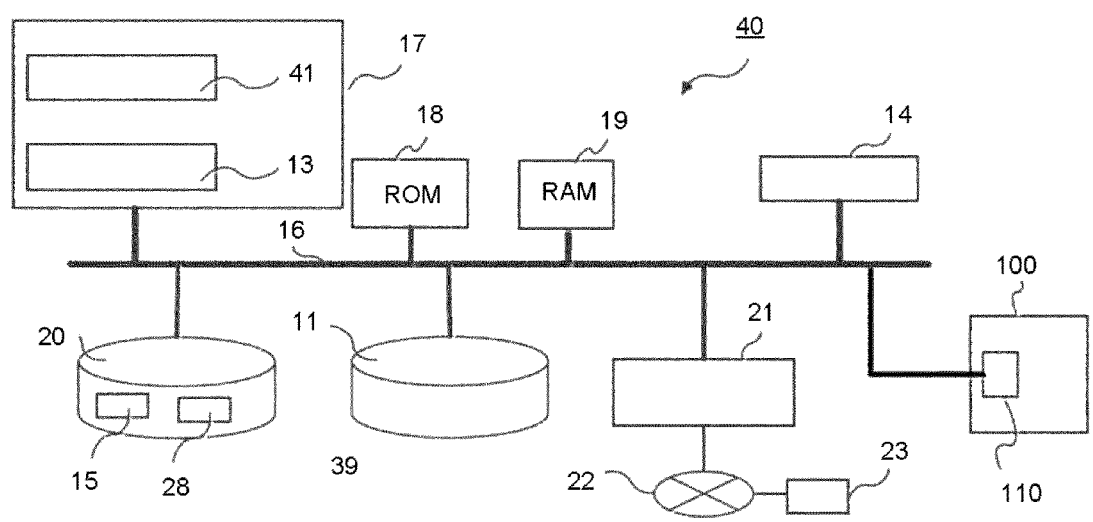
FIG. 13 is a block diagram illustrating an individual verification apparatus according to a second embodiment.

FIG. 13 is a block diagram illustrating an individual verification apparatus involved in the second embodiment. An individual verification apparatus 40 carries out an image correction using the information received from an information server 23.

The individual verification apparatus 40 is arranged on the copier 100.

The individual verification apparatus 40 is provided with a network interface 21. The network interface 21 receives information from the information server 23 through a network 22.

The individual verification apparatus 40 has a prediction correction section 41 (correction section) which calculates the magnitudes of the changes of the brightness, the contrast ratio and the light reception direction of a face image.

The prediction correction section 41 calculates the magnitudes of the changes based on a plurality of sample images taken by the camera 14 at fixed moments of many days.

The prediction correction section 41 calculates the line-of-sight direction of the camera 14 based on magnitudes of changes, date information and pre-stored sun position information indicating the position of the sun at each moment.

Date information is mm/dd/yyyy. The prediction correction section 41 associates date information with an image taken at the same day. The date information is provided by a defaulted function of the CPU 17.

The other parts of the individual verification apparatus 40 are substantially structurally identical to the individual verification apparatus 10 shown in FIG. 1, if not defined particularly.

Next, the functional actions of the individual verification apparatus 40 having this structure are described below.

(1) First Form

First, the prediction correction section 41 acquires, the daily azimuth and altitude of the sun, that is, the daily position information of the sun through, for example, a download operation. Alternatively, the prediction correction section 41 calculates the azimuth and the altitude of the sun using a calculation formula in which date is used as a variable.

The prediction correction section 41 causes the camera 14 to take images at fixed moments, for example, causes the camera 14 to take the image of a background at 12:00 pm every Monday.

The prediction correction section 41 stores a plurality of image samples in the storage device 20.

For example, the prediction correction section 41 collects the sample images taken at 12:00 pm every Monday in several past months.

The prediction correction section 41 extracts the brightness, the contrast ratio and the light reception direction of each sample image. For example, the prediction correction section 41 records the azimuth and the altitude of the sun at 12:00 pm on August 6.

The prediction correction section 41 accumulates daily sample data for several months.

The prediction correction section 41 calculates the magnitudes of the changes occurring in brightness, contrast ratio and light reception direction at 12:00 pm of an unknown day.

The prediction correction section 41 determines, according to brightness values of image data, that the unknown day is darker than the days in August.

The prediction correction section 41 determines, by comprising the altitude of the sun in the south in august with that of the sun in the south on the unknown day, that the sun in the south on the unknown day is lower in altitude.

The prediction correction section 41 determines that the time is 12:00 pm on January 10 according to observation information and the position information of the sun. The observation information refers to the brightness of the sun, the south azimuth of the sun and the coordinates of the altitude of the sun.

Further, the prediction correction section 41 detects the line-of-sight direction of the camera 14 based on a specific date and the observation information. The prediction correction section 41 can detect the direction the camera 14 faces.

Then, the individual verification apparatus 40 takes the picture of a user using the camera 14 after 12:00 pm. The taken image for registration is input to the individual verification apparatus 40.

The individual verification apparatus 40 associates the face image data in the image data for registration with personal ID and then registers the associated face image data and personal ID in the database 11, without correcting a background image.

Sequentially, if image data for verification is input to the prediction correction section 41 at 4:00 pm, then the image data for verification is corrected using reference values for face images registered in the database 11. The prediction correction section 41 generates image data for verification.

The verification section 13 verifies the individual using the face part of the image data for verification and the face images in the database 11.

Even if the line-of-sight direction of the camera 14 is unknown to the prediction correction section 41, the individual verification apparatus 40 can determine the line-of-sight direction of the camera 14 according to the magnitude of the change in the position of the sun at a fixed position.

As the line-of-sight direction of the camera 14 can be determined according to the magnitude of the change in sun position, the prediction correction section 41 eliminates the influence caused by the shade of a neighboring building or by the reflection from a window on the result of the determination.

By using the individual verification apparatus 40, image data for verification can be corrected without using a background image.

The light reception direction mainly changes with the azimuth of the sun and the altitude of the sun with time going on. This is because sunlight enters a room from a window from different azimuths and different angles at different time.

In a stationary type copier 100, the camera 14 is located at a fixed position with respect to a window, facing a fixed direction. The position relationship between the camera 14 and the window is unchanged no matter where the copier 100 is arranged, what the season it is and when the time it is.

By making a determination at a determined time, for example, at 12:00 pm, every other day, the individual verification apparatus 40 can predict the direction the camera 14 faces.

Correction values can be determined according to the date on which face image data for registration is taken, without using the first reference values.

(2) Second Form

In the second form, a light source refers to an indoor illuminator.

The individual verification apparatus 40 may use a building maintenance server managed by a building management corporation as the information server 23.

The information server 23 sends the illuminance of the illuminator in each residential room in real time. The illuminance is, or example, a Lux value. A smart meter is installed in the room.

The information server 23 collects the real-time power consumption of each room for the individual verification apparatus 40 using a smart system.

The individual verification apparatus 40 receives the illuminance information of the illuminator in a room from the information server 23.

The prediction correction section 41 calculates the brightness of a face image according to the illuminance information of the illuminator in a room received from the information server 23.

The prediction correction section 41 calculates the contrast ratio and the brightness of the face image in the same way.

The prediction correction section 41 calculates the light reception direction of the face image according to pre-stored illuminator information. The illuminator information refers to the positions of indoor illuminators, the number of indoor illuminators and the orientations of the indoor illuminators with respect to the camera 14.

The information server 23 may be an in-company server provided by a company for the departments of the company.

The individual verification apparatus 40 acquires image data for registration using the camera 14 at 12:00 pm.

The individual verification apparatus 40 associates the face image data in the image data for registration with personal ID and then registers the associated face image data and personal ID in the database 11, without carrying out a correction using a background image.

The individual verification apparatus 40 corrects input image data for registration using the reference values stored in the database 11 for face images at 4:00 pm.

The verification section 13 verifies an individual using the face part of the image data for verification and the face images in the database 11.

(3) Third Form

In the third form, the change in the weather is acquired form the information server 23.

The prediction correction section 41 calculates the brightness, the contrast ratio and the light reception direction of a face image according to the weather information indicating a sunny day or a rainy day acquired from the information server 23.

The individual verification apparatus 40 can determine the brightness and the contrast ratio of the face image according to the illumination condition and the weather information of the location where the copier 100 is arranged.

After acquiring illumination information and weather information through the network 22, the individual verification apparatus 40 corrects the face image. The first reference values are not used during the correction process.

Correction values can be determined by associating registered image data for verification with the illumination condition or weather information.

As stated above, the installation location of the copier 100, the season, the date, the weather and the illumination condition are all stored in the individual verification apparatus 40.

It is not needed to store first reference value information or the image in an unneeded area (the area B or C shown in FIG. 7), thus saving the capacity of the database 11.

In this way, the individual verification apparatus reduces the influence from the surroundings when carrying out a face verification.

The embodiments shown in FIG. 1-FIG. 13 are merely exemplary and can be variously modified in structure or step.

In the light reception detection method illustrated in FIG. 7, the individual verification apparatus 10 performs a pre-processing if the background is not a single color different from black or a single pattern, for example, if the ceiling or wall is coated by different colors.

For example, the individual verification apparatus 10 converts an image area (the area B or C) corresponding to a coated part into a white color in advance.

Alternatively, the individual verification apparatus 10 carries out a verification processing after the ceiling or wall is pre-covered by white paper.

Reference values can be highly accurately obtained according to the position, for example, the area B or C, where correction values are detected.

The camera 14 may be an infrared camera or a near-infrared camera.

In the foregoing embodiments, a light reception direction is represented by an angle by which the light reception direction is deviated from the perpendicular line of an image area. The light reception direction may represent a solid angle using the angle of the deviation of the light reception direction from the center of the view of the camera 14.

In the foregoing embodiments, in the detection of a light reception direction, the four corners of an image area are photographed and then compared in brightness.

In the detection of a light reception direction, an image region may be divided into grids, and then the direction along which brightness changes is detected. Alternatively, in the detection of a light reception direction, an image region may be divided into a plurality of slits, and then the direction along which brightness changes is detected.

The camera 14 may be installed at any position of the copier 100. The camera 14 may be immobilized on the body of the copier by a bracket, an arm or a brace.

Holes may be set on the cover of the copier 100. The camera 14 may be immobilized on an inner side of the cover with its image sensor panel exposed outside the cover from the hole.

The back of the image sensor panel should not face a light source.

Further, the individual verification apparatus 10 may be provided with a Bluetooth (registered trademark) interface. Alternatively, a wireless camera may send an image to the individual verification apparatus 10 according to a Bluetooth-based communication protocol.

A wireless camera fixed on the wall or ceiling of a room takes image data for verification and image data for registration. Installation at such a position, the wireless camera gets a wider view and can take an image more freely. Moreover, verification accuracy is improved.

Apparently, the wireless camera may be an installed multi-function peripheral.

A processor-readable recording medium causes a CPU to execute various processing, wherein the recording medium may be a USB memory, a CD-ROM or a DVD-ROM.

Modified embodiments cause no impairment to the priority of the image forming apparatus, the image forming method and the recording medium involved herein.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An individual verification apparatus, comprising:
   a camera configured to take a face image in an image region in which an individual is irradiated from a light source and observed from a fixed line-of-sight direction, a direction of the light source varying with time;
   a database configured to associate the face image by the camera with unique information of the individual, the face image having a first brightness value thereof and a first light reception direction thereof in the image region; and
   a processing unit coupled to a memory and the database, the processing unit facilitating execution of instructions to perform operations comprising:
      correcting at least one of a second brightness value and a second light reception direction of image data to match the first brightness value and the first light reception direction, the image data stored in the memory for verification, the second brightness value and the second light reception direction being obtained at a timing different from another timing at which the first brightness value and the first light reception direction are obtained, respectively, and
      verifying the individual using a face part in the image data for verification and the face image stored in the database.

2. The individual verification apparatus according to claim 1, further comprising
   a storage device configured to store a reference brightness value and a reference light reception direction of a background image, wherein
      the operations by the processing unit further include:
      correcting the face image for registration using the reference brightness value and the reference light reception direction of the background image,
      registering thus corrected face image for registration as the face image in the database, the corrected face image for registration having the reference brightness value and the reference light reception direction, and
      correcting the image data for verification to generate a corrected image data for verification having the reference brightness value and the reference light reception direction.

3. The individual verification apparatus according to claim 2, wherein the operations further include:
   generating the reference brightness value and the reference light reception direction based on a plurality of persons within the same period of time.

4. The individual verification apparatus according to claim 1, further comprising
   an interface connected with an information server, wherein the operations further include:
      calculating magnitudes of changes in the first brightness value and the first light reception direction according to a plurality of sample images taken by the camera at fixed moments of a plurality of days, and calculating the line-of-sight direction according to the magnitudes of the changes and pre-stored sun position information for each day and hour.

5. The individual verification apparatus according to claim 1, further comprising:
an interface connected with an information server, wherein the operations further include:
calculating the first brightness value according to illuminance information of an indoor illuminator received from the information server, and
calculating the first light reception direction according to pre-stored illuminator information.

6. The individual verification apparatus according to claim 1, further comprising:
an interface connected with an information server, wherein the operations further include:
calculating the first brightness value and the first light reception direction of the face image according to weather information indicating a sunny day or a rainy day received from the information server.

7. The individual verification apparatus according to claim 1, wherein the operations further include:
correcting the image data for verification using a contrast ratio in the image region.

8. The individual verification apparatus according to claim 1, further comprising:
a printer section installed and configured to for permitting, through the verifying by the processor unit, the individual to carry out a user-based operation to the printer section.

9. An individual verification method, comprising:
generating, during a first timing, a reference brightness value and a reference light reception direction of a background image in an image region in which an individual is irradiated from a light source and observed from a fixed line-of-sight direction, a direction of the light source varying with time;
correcting, within a second timing, a face image in the image region for registration using the reference brightness value and the reference light reception direction, and registering thus corrected face image for registration having the reference brightness value and the reference light reception direction in a database, the face image being associated with unique information of the individual;
correcting, during a third timing different from the second timing at which the corrected face image for registration is registered in the database, image data for verification, of which the image data has a second brightness value thereof and a second light reception direction thereof, to generate thus corrected image data for verification having the reference brightness value and the reference light reception direction; and
verifying the individual using a face part in the image data for verification and the face image in the database.

10. A non-transitory computer readable recording medium, the medium storing a program causing a processor to execute the following processing:
generating a reference brightness value and a reference light reception direction of a background image in an image region in which an individual is irradiated from a light source observed from a fixed line-of-sight direction, a direction of the light source varying with time;
correcting a face image in the image region for registration using the reference brightness value and the reference light reception direction, and accessing an address of a database to register thus corrected face image for registration having the reference brightness value and the reference light reception direction in the database, the face image being associated with unique information of the individual;
correcting image data for verification, of which the image data has a second brightness value thereof and a second light reception direction thereof which are obtained at a timing different from another timing at which the reference brightness value and the reference light reception direction are obtained, respectively, to generate thus corrected image data for verification having the reference brightness value and the reference light reception direction; and
verifying the individual using a face part in the image data for verification and the face image in the database.

\* \* \* \* \*